Oct. 24, 1967  R. D. GILLEN ETAL  3,349,408
RECORDER

Filed Aug. 12, 1965  2 Sheets-Sheet 1

United States Patent Office 3,349,408
Patented Oct. 24, 1967

3,349,408
RECORDER
Raymond D. Gillen, North Wales, William T. Knipe, Sellersville, Will McAdam, Bluebell, and Norman E. Polster, Southampton, Pa., assignors to Leeds & Northrup Company, a corporation of Pennsylvania
Filed Aug. 12, 1965, Ser. No. 479,163
10 Claims. (Cl. 346—112)

This invention relates to improvements in exhibiting devices of the type employing a strip chart together with a capillary pen assembly for recording and indicating magnitudes of conditions under measurement, and has for an object means for chemically providing a visible marking on the chart used in such devices including a two component marking system, each component of which is substantially colorless but whose combination provides a visible mark on the chart.

In recorders of the type used to record magnitudes of a condition upon a chart, the marking means employed generally comprises a pen consisting of a capillary tube containing a commercially available recording ink composed of organic dyes. While such inks provide satisfactory markings on the chart of the magnitudes of the conditions to be recorded, their use leaves much to be desired from the standpoint of ease of continuous, uninterrupted operation of the marking pen and, consequently, of the recording apparatus itself. For example, due to the evaporation of the liquid vehicle for the colored organic dyes, the dyes precipitate as solid particles causing the capillary tube to clog. Since this may occur during a recording operation, considerable data may be forever lost by virtue of the inability of the pen to transcribe the magnitudes of the conditions which it is desired to observe and permanently to record.

It is also known to employ electrochemical recording systems to record magnitudes of conditions, which systems involve the use of a moist recorder paper impregnated with a reagent sensitive to the passage of electric currents. This paper is generally supported on a metal plate and a metal stylus is arranged to move over the surface of the paper. The recording mark is made on the paper by means of the electric current flowing therethrough from the metal stylus which causes the sensitizing reagent in the paper to change color. Such electrolytic recording systems are more fully described in U.S. Patents 2,348,839, 2,339,267 and 2,692,228.

A significant limitation of the foregoing electrolytic recording process is that it requires the chart paper to be in a wet or moist condition when being marked. Moreover, the very nature of the system requires that specific electrolytic apparatus be used. Thus, the system lacks versatility, and is not adaptable for use in the more conventional recorders of the type employing a dry paper chart and a fluid ink marking medium.

In accordance with one embodiment of the present invention, there is provided means for minimizing the possibility of clogging of the capillary tube of the pen used to provide the marking of the magnitudes of the condition to be recorded thus making possible a recording instrument which is more dependable than heretofore available.

In carrying out the present invention in one form there is provided in a recorder, the combination with a chart on which there are to be recorded magnitudes of a condition, of a pen consisting of a capillary tube, and means for providing relative motion between said pen and said chart, of means for minimizing the possibility of clogging of the capillary tube during the operation of the recorder comprising a reservoir for the first component of a two component marking system, means including the chart for supplying in the region beneath said pen the second component of said marking system, means for driving said pen relative to said chart for the chemical production of a visible marking on said chart of said magnitudes of said condition, said first and second components of said marking system being independently selected from the class consisting of (a) a salt of a transition metal, and (b) an organic compound capable of reacting with said salt to provide said visible marking of said chart, with the provision that when the first component is selected from (a) the second component must be selected from (b) and vice versa, that is to say, that when the first component is selected from (b) the second component must be selected from (a), it being understood that each component is selected exclusively from (a) or exclusively from (b).

As used herein, the term "transition metal" includes those metals falling in the first and second transition series as well as the lanthanide series and the actinide series, that have valence electrons in two shells instead of only one, that are characterized in most cases by variable oxidation states and magnetic properties, that form water soluble salts whose aqueous solutions are lightly colored, i.e. substantially colorless and that are capable of forming complexes with certain types of organic compounds, as for example, chelates with carbonyl compounds. Examples of transition metals whose water soluble salts may be employed, and whose use is preferred in the practice of the present invention are set forth in Table I below.

TABLE I

| Iron | Vanadium |
|---|---|
| Nickel | Chromium |
| Cobalt | Manganese |
| Copper | Cerium |

Some of the preferred salts of the above metals whose aqueous solutions are colorless and which may be employed in the practice of the invention are, for example, the halide salts thereof, such as chlorides, bromides or iodides; the sulfates, chlorates, carbonates and nitrates; and the salts of the above metals and organic acids, as for example, their acetates, propionates, etc. A particular advantage of the nitrate salts of the metals of Table I is their high solubility in water, particularly in the case of iron and nickel nitrates.

The organic compounds used to provide the complementary component of the two component marking system employed in the practice of the invention may be defined as those compounds whose alcoholic solutions are lightly colored, i.e. substantially colorless, and which react with the transition metal salts of the type described above to provide a metal complex such as a chelate, for example, which is colored, i.e. capable of providing a visible mark on the chart. Examples of such compounds are the alkyl and cycloalkyl dioximes, such as, for instance, dimethyl glyoxime, diethyl glyoxime and 1, 2 cyclohexanedione dioxime. Specific examples of a preferred group of organic compounds useful in the practice of the present invention are set forth in Table II below.

TABLE II

| | |
|---|---|
| Acetanilide | α-Napthol |
| Acetylsalicylic acid | β-Napthol |
| Acridine hydrochloride | 1,4-napthoquinone |
| Aluminon | Nitrobarbituric acid |
| p-Amino phenol | Nitrilotri-acetic acid, Na salt |
| Ammonium sulfamate | |
| Ammonium tartarate | o-Nitro-phenol |
| Ammonium thiocyanate | 4 nitro-o-phenylene diamine |
| Benzidine hydrochloride | |
| Benzoic acid | Nitrosobarbituric acid |
| Benzoin α oxime | 1-nitroso 2-napthol |

TABLE II—Continued

| | |
|---|---|
| 2,3-butanedione monoxime | Nitroso-R salt |
| Chromotropic acid, Na salt | Oxalic acid |
| Citric acid | 2,4-pentanedione |
| Cupferron | p-Phenylene diamine |
| 1,2 cyclohexanedione dioxime | 1, 10 phenanthroline hydrate |
| Diansidine | P-phenyl azo phenol |
| 2,4-dihydroxy acetophenone | 4 phenyl azo resorcinol |
| | 5 phenyl salicylic acid |
| N,N-dimethyl dithio-oxamide | Phenylthiohydantoic acid |
| | Phloroglucinol |
| Dimethylglyoxime | Potassium iodide+starch |
| Dinitroresorcinol | Potassium thiocyanate lead thiocyanate+KI |
| Sym-diphenylcarbazide | |
| Diphenylglyoxime | Pyrocatechol |
| Diphenyl thiocarbazone | Pyrogallol |
| Dithio-oxamide | Quinaldic acid |
| Ethylene diamine tetraacetic acid, Na salt | Quinone |
| | Resorcinol |
| Fluorescein | Rhodizonic acid, K salt |
| Formaldoxime hydrochloride | Salicyladoxime |
| | Salicylanilide |
| Gallocyanine | Salicylic acid |
| Glycine | Sodium acetoacetate |
| Hydrazobenzene | Sodium benzoate |
| Hydroquinone | Sodium diethyl dithiocarbamate |
| p-Hydroxybenzaldehyde | |
| 2 hydroxyquinoline | Sodium salicylate |
| 8-hydroxy 7-iodo 5-quinoline sulfonic acid | Sodium thiocyanate |
| | 5-sulfosalicylic acid |
| 8-hydroxyquinoline | Tannic acid |
| 8 hydroxy 5 quinoline sulfonic acid | Thio-acetamide |
| | Thiourea |
| Indole, indole+NaBr | Tiron indicator |
| 1,3-isoquinoline diol | o-Tolidine |
| Luminol | Violuric acid |
| Malic acid | |

For further objects and advantages of the invention and for detailed descriptions of other useful features, reference is to be had to the following description in conjunction with the accompanying drawings in which.

Figure 5:
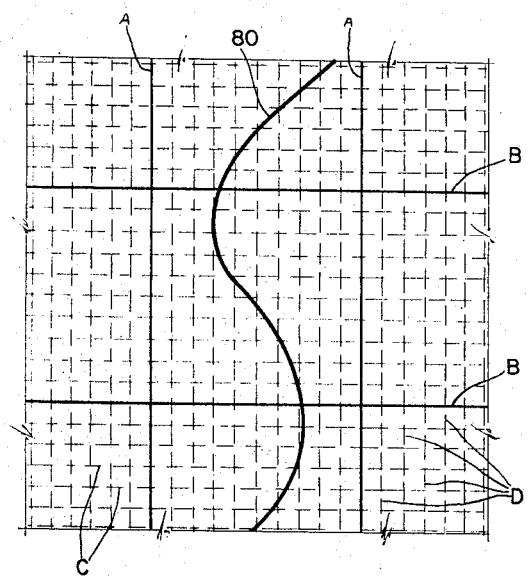
Figure 6:
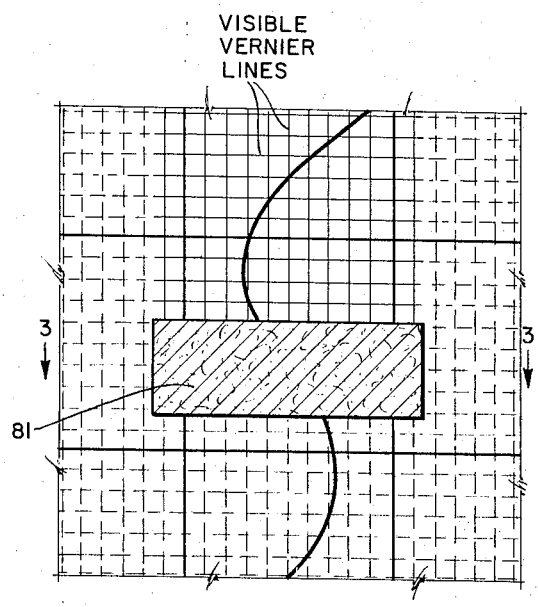

FIG. 5 is a front view (enlarged) of a portion of a paper chart upon which there has been recorded a magnitude of a condition and upon which there has been applied a vernier scale with one of the two substantially colorless components of the two component marking system of the invention; and FIG. 6 is a front view (enlarged) of the same portion of the chart shown in FIG. 5 having its invisible vernier scale made visible by the application thereto of the second component of the two component marking system in accordance with the invention.

Figure 1:
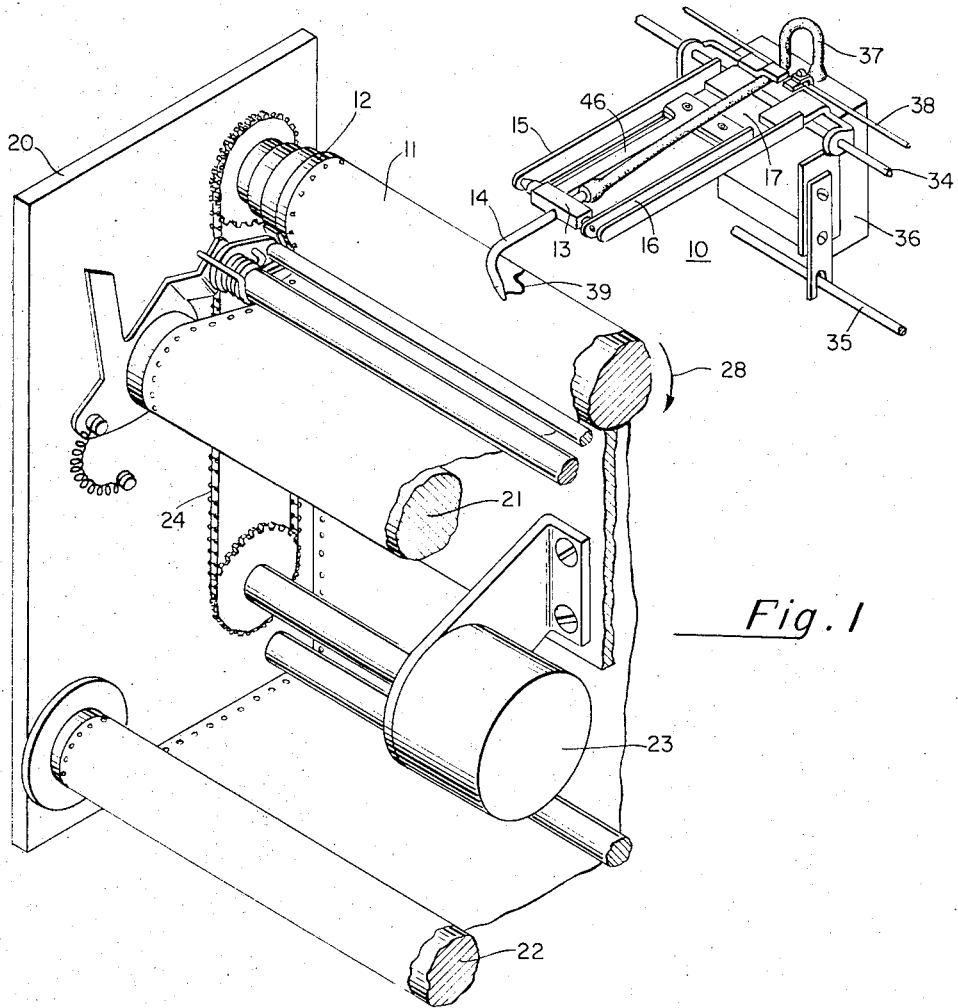
FIG. 1 is an isometric view, partially in section, of a portion of a recorder including a marker assembly, drive roll, supply roll, take-up roll, and a chart.

Referring now to FIG. 1, a marker assembly 10 is shown in recording position on chart paper 11 positioned over drive roll 12. For the purpose of clarity of illustration the marker assembly 10 has been rotated 180° out of its normal position. Assembly 10 includes a capillary pen support member 13 and associated capillary pen 14 joined between a support arm 15 and a flexible support arm 16 of a carrier member 17 together with a capillary pen bracing spring 46, a reservoir 36 for one component of the two component marking system of the invention, and a capillary tube 37. The marker assembly 10 is supported in operating position by a stationary rod 34 and a marker assembly lifter rod 35. The entire assembly is moved along the rods by a drive cord 38 which is driven by a balancing motor (not shown). A more detailed discussion of the marker assembly 10 may be found in copending application, Ser. No. 462,951 filed June 10, 1965, now Patent No. 3,296,623, and assigned to the assignee of the present invention.

The main frame 20 of the recorder is a supporting member for the paper supply roll 21, the paper take-up roll 22 and drive roll 12, as well as for the drive motor 23 which drives the paper drive roll 12 at selected speeds through drive chain 24 in the direction of the arrow 28.

In the practice of one embodiment of the present invention a dilute aqueous solution (i.e., containing from about 2 to about 10%) of a transition metal salt such as, for example, nickel chloride is placed in the reservoir 36 in amounts sufficient to fill the capillary tube 37 and provide the flow of the solution to the pen 14. The chart paper 11 upon which the magnitudes of the condition are to be recorded comprises a paper which has been impregnated with an organic compound whose alcoholic solution is substantially colorless and which is reactive with the salt of the transition metal whose aqueous solution fills the reservoir 36, to provide a visible marking 39 on said chart, and thus record the magnitude of the condition under observation. The organic compound such as dimethyl glyoxime for example, may be applied to the paper by any of the methods for coating paper well known to those skilled in the art, as for example by passing the paper through an alcoholic solution of that compound, and subsequently permitting the alcohol to evaporate leaving a thin coating of the compound on the surfaces of the paper. Alternatively, the organic compound may be applied by brushing or spraying only one surface of the chart (or selected portions of the chart surface) with the alcoholic solution of the organic compound, and subsequently permitting the alcohol to evaporate. Other methods for coating or impregnating the chart paper with the organic compound constituting the second component of the two component marking system of the invention will readily occur to those skilled in the art.

It will be appreciated that the organic compound may also be used as the "ink" component for the capillary pen 14, and that the salt of the transition metal may be employed as the coating for the chart paper 11. This may be readily accomplished by forming a dilute alcoholic solution of the organic compound and filling the reservoir 36 with the solution to the extent necessary to fill the capillary tube 37 and supply the alcoholic solution to the pen 14. The chart paper may be coated either entirely or in limited areas thereof with the salt of the transition metal by applying to the paper an aqueous solution of the salt, and subsequently evaporating the water. In this connection, it is preferable to employ a solution of the transition metal salt in alcohol if possible, otherwise in a mixture of alcohol and water to prevent the wrinkling of the chart paper which would occur if only an aqueous solution of the salt were used as the coating medium.

If the viscosity of the transition metal salt solution employed in the reservoir (or the viscosity of the alcoholic solution of the organic compound) is not high enough to be used in the pen 14, it may be increased by the addition of glycerine or of a similar high viscosity liquid which is miscible with water or alcohol.

When, as mentioned above, the first component of the two component marking system consisting of an aqueous solution of a nickel salt such as nickel chloride is placed in the reservoir 36 and the paper 11 is coated with dimethyl glyoxime, the pen 14 will form a bright red marking 39 representative of the magnitude of the condition being recorded. In this connection there are set forth in Tables III and IV below the various colors of markings which may be obtained on the chart paper by employing various different combinations of transition metal salts and organic compounds.

Figure 2:
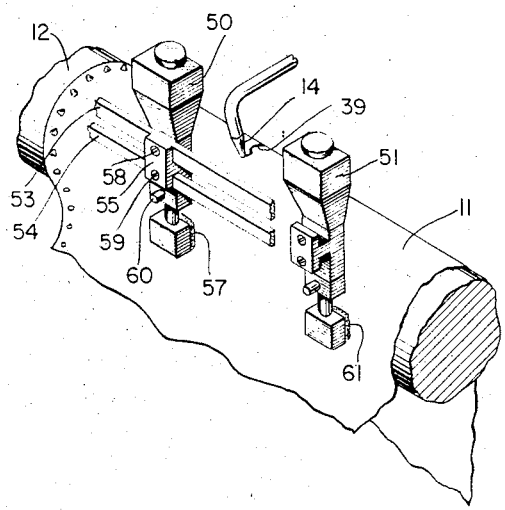
FIG. 2 is an isometric view of a portion of a recorder including a drive roll and a marking assembly which is exemplary of a different embodiment of the invention.

Referring now to FIG. 2, the tip of the capillary pen 14 is shown forming a visible mark 39 on the chart 11 being rotated over the drive roll 12. The wick-reservoir assembly 50 is secured to two parallel bars 53 and 54 by bracket 55 which permits the assembly to be moved along the bars so that its wick portion 57 may engage the chart paper at different locations along the roll. The assembly 50 may be secured in any desired position along the chart by tightening the screws 58 and 59 to engage the twin supporting bars 53 and 54. In operation, the reservoir assembly 50 is filled with a solution of one of the components of the two component marking system capable of forming a visible mark with the second component of the marking system contained in the reservoir for the capillary pen 14. A valve 60 is provided near the lower portion of the marker assembly 50 to control the amount of fluid available to the wick 57 which is in engagement with the chart paper 11. Thus, by employing the wick-reservoir assembly 50 it is possible to provide a coating of one component on the chart capable of reacting with the second component in the pen at certain specific areas of the chart. In this connection, a second wick-reservoir assembly 51 similar to 50 is also shown containing a component different from that contained in the reservoir 50 and also capable of forming a different color marking with the component used in the capillary pen 14.

Although the wicks 57 and 61 of the marker assemblies 50 and 51 respectively, will, as shown, provide only narrow coating bands on the chart, it will be appreciated that larger wick assemblies may be used. For example, a wick assembly having a wick portion capable of coating the entire width of the paper chart may be employed.

In the construction shown in FIG. 2, the paper chart 11 has been pre-coated with a first organic compound capable of forming a colored mark 39 when contacted with the aqueous solution of a transition metal salt supplied on the tip of the capillary pen. The wick-reservoir assemblies 50 and 51 each contain alcoholic solutions of organic compounds differing from that used to coat the entire paper chart 11. The organic compounds contained in reservoirs 50 and 51 are themselves reactive with the salt of the transition metal whose aqueous solution is supplied by the pen 14 to form marks differing in color. Thus by employing the arrangement shown in FIG. 2 the magnitude of the condition to be recorded will appear in one color along the portion of the chart which has not been contacted by the wicks of the reservoir assemblies 50 and 51, and will appear in different colors so as, for example, to show attainment of a maximum value where the pen comes into contact with that portion of the chart coated with the organic compound from assembly 50, and yet another color to show a minimum value when coming into contact with that portion of the chart coated with the organic compound contained in reservoir 51.

Figure 3:
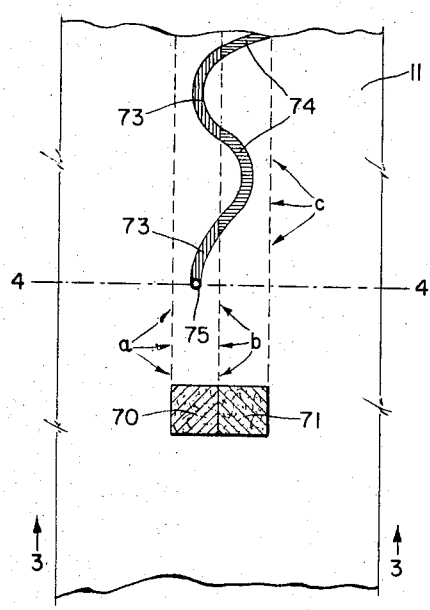
FIG. 3 is a diagrammatic view of a portion of a paper chart having a magnitude of a condition recorded thereon in accordance with the present invention.

A variation of the latter embodiment is shown in FIG. 3 depicting in a diagrammatic form a portion of a paper chart 11 traveling in the direction of the arrows 3—3. The chart is in engagement with wicks 70 and 71 which provide invisible coatings of organic compounds on the paper in the areas bounded by the dotted lines $a$, $b$, $c$. The capillary pen 75 contacts the paper along the line 4—4 and is filled with an aqueous solution of a transition metal salt which provides a mark 73 of one color in the area of the chart bound by the dotted lines $a$, $b$ and a mark 74 of a different color when in contact with the area of the chart bounded by the dotted lines $b$, $c$.

Figure 4:
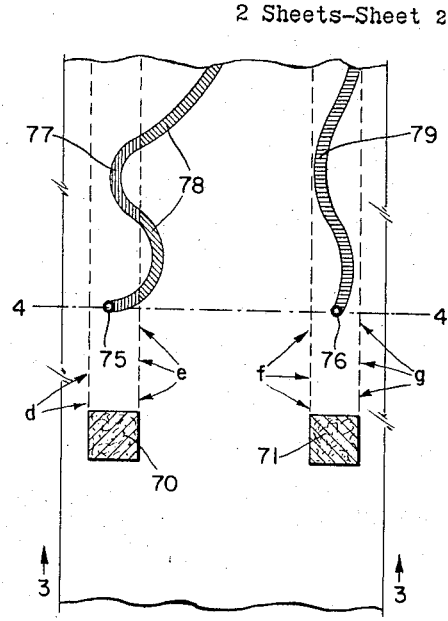
FIG. 4 is a diagrammatic view of a portion of a paper chart having the magnitudes of a plurality of conditions recorded thereon in accordance with the present invention.

A further variation of the embodiment of FIG. 2 is shown in FIG. 4 which depicts in diagrammatic form a portion of a paper chart 11 traveling in the direction of the arrows 3—3. The chart is in engagement with wicks 70 and 71 which provide invisible coatings of organic compounds on the paper in the areas defined by the dotted lines $d$, $e$, and $f$, $g$. Capillary pens 75 and 76 contact the paper along the line 4—4 each being filled with an aqueous solution of a different transition metal salt. The chart paper 11 is itself coated with a third organic compound different from the two organic compounds applied to the paper by the wicks 70 and 71. Thus, the pen 75 provides a marking 77 of one color in the area defined by the dotted lines $d$, $e$ and a mark of a different color 78 when in contact with that portion of the chart which is not coated by either of the wicks 70 or 71 e.g. the area between the dotted lines $e$, $f$. At the same time, the pen 76 which is fed from the reservoir (not shown) containing the aqueous solution of a transition metal salt different from that used in pen 75 provides a mark 79 when in contact with the chart in the area defined by the dotted lines $f$, $g$, i.e. the area coated by the wick 71. In this manner, a recording instrument may, with the use of two or more pens, record the magnitudes of plurality conditions, which conditions will appear as different colored markings on the chart depending upon their deviations from prescribed minimums and maximums. Thus, the wicks may be arranged in such a manner so as to vary the point at which a color change will take place where the measured value goes above or below the control setting of the wick assembly.

In the same manner, two or more different organic compounds can be coated across the chart in the direction perpendicular to the direction of travel so that a color change may take place at a certain time of day, or at certain time intervals.

Similarly, different areas of the chart may be coated with different organic compounds. Two or more metal salts may then be mixed and the mixture fed into the reservoir for the capillary pen. The resulting marking provided upon the contact of the pen with the coated paper will then vary depending upon the particular combination of metal salts in solution and the combination of different organic coatings provided upon the surface of the paper chart.

FIG. 5 is illustrative of a further embodiment of the invention and shows an enlarged portion of chart paper 11 provided with visible linear graph lines A and B, lines A being in the vertical direction and lines B being in the horizontal direction. The chart also contains an invisible fine graph scale printed on the paper with one of the two components of the marking system of the present invention, the horizontal lines being designated as C and the vertical lines being designated as D. The latter fine scale formed by the lines C, D remains invisible prior to its exposure to the second component of the two component marking system of the invention. The chart may then be used to record the magnitude of a condition shown as 80 upon the chart, it being kept in mind that in the event a two component marking system is employed to provide the marking 80 of the magnitude of the condition, the organic compound forming the coating on the chart is different from the organic compound used to provide the fine lines C, D.

In this arrangement, after the magnitude of the condition has been recorded on the chart, it is possible to apply the second component of the marking system (of which the "ink" used to print the invisible lines C, D is the first component) to render visible the finer calibration on the chart provided by lines C, D. As shown in FIG. 6, this may be accomplished by applying to the chart in the area where a fine chart calibration is desired, a wick 81 wetted with the second component of the two component marking system of which the first component is the material used to print the invisible lines C, D. The wick 81 is moved in the direction of the arrows 3—3, and upon contacting the paper renders the invisible lines C, D visible. Thus, the original chart may have printed thereon visible lines spaced one centimeter apart, i.e. printed upon the surface of the chart with ordinary ink. The chart may also contain a finer scale provided by printing invisible lines spaced a millimeter apart by printing the lines on the chart with an aqueous solution of a transition metal salt. The one centimeter lines will then be visible at all times to provide a coarse chart calibration of the magnitude of the condition which is recorded thereon. In areas where a finer resolution of the calibration is desired, an alcoholic solution of an organic compound capable of providing a visible line when in contact with the transition metal salt used to print the one millimeter lines may be applied to the chart. Thus, recording charts may be provided with invisible vernier graph scales with invisible ink which may be made visible at any time to obtain a finer resolution of the calibration desired to read the magnitudes of the condition recorded upon the chart.

The marking assembly of the present invention is also advantageous from the standpoint that the use of the water insoluble organic dye inks is eliminated. The aqueous solutions of the transition metal salts and the alcoholic solutions of the organic compounds reactive therewith are colorless, may be washed off more easily, and thus create fewer handling problems and provide a cleaner system than was heretofore available.

As noted above, the primary advantage of the marking system of the present invention resides in the use of dilute solutions of transition metal salts or organic compounds in the capillary pen assembly, thus minimizing the possibility of clogging the capillary tube of the pen during operation of the recording instrument. In this connection, the concentration of organic compounds in alcohol and of transition metal salts in water may range up to 10% or more by weight. Generally speaking, dilute solutions are preferred both from the standpoint of economy and also from the standpoint of minimizing the possibility of clogging of the capillary tube. The precise concentration of transition metal salt in the aqueous solution or of the organic compound in the alcoholic solution may, of course, vary to a large extent depending upon their respective solubilities in the respective solvents. The preferred concentration may be described as the minimum concentration which provides a sharp visible mark on the chart paper after being contacted with the complementary component of the two component marking system. In this connection a 5% solution of the transition metal salt in water or of the organic compound in alcohol has been found to be entirely satisfactory.

In general, methyl alcohol or ethyl alcohol may be employed as the solvent for the organic component of the two component marking system used in accordance with the present invention. In those cases where the solution of the organic compound is the pen component, it is preferred that a higher boiling solvent be employed such as, for example, butyl alcohol, hexyl alcohol or benzyl alcohol, to minimize solvent evaporation.

Of all the transition metal salts tested to provide a marking of a condition with a recorder in accordance with the present invention, it was found that iron salts, and particularly the ferric salts, produced a marking with almost every compound tested. Generally speaking, ferric salts are preferred to ferrous salts because of their high stability, ferric salts being in their highest oxidation states and in solution changing only to the extent of their concentration caused by the evaporation of water. Nickel salts are also preferred due to the bright markings which they provide, particularly with dioximes.

In order that those skilled in the art may better understand how the present invention may be practiced, the following examples are given by way of illustration and not by way of limitation. The chart paper is coated with the desired organic coating composition by immersing the chart through a solution such as an alcohol solution of the respective organic compounds and thereafter removing the chart from the solution and evaporating the solvent. The transition metal salt component of the two component marking system is in each case dissolved in water to provide an aqueous solution containing from 1 to 10% of the salt. Where the viscosity of the aqueous solution is insufficient for it to function properly through the capillary tube, glycerine may be added to increase the viscosity. The aqueous solution of the transition metal salt is used to fill the reservoir of the marking assembly. The recorder is then arranged to record the magnitude of a condition (such as temperature) over a period of several hours. The particular coating compositions employed to coat the charts used in the tests, the transition metals whose aqueous salt solution provided the fluids used in the capillary pen, and the resulting color of the mark formed on the chart paper are set forth in Table III below.

TABLE III

| Coating Composition | Transition Metal Ions Used | Color of Mark |
|---|---|---|
| (a) KCNS + dimethylglyoxime | Fe | Black. |
| | Cu | Black. |
| | VO | Grey. |
| | Ni | Red. |
| | Co | Green. |
| (b) Tannic acid+dimethylglyoxime. | Co, Cu | Yellow. |
| | Ni | Red. |
| | Fe | Black. |
| | VO | Grey. |
| (c) Violuric acid+dimethylglyoxime. | Cu, Co | Yellow |
| | Fe | Brown. |
| | Ni | Red. |
| | VO | Grey. |
| (d) 8 HO-Quinoline+1,2 cyclohexanedione dioxime. | VO, Fe | Black. |
| | Ni | Red. |
| (e) Salicylic acid+1,2 cyclohexanedione dioxime. | Fe, VO | Black. |
| | Ni | Red. |
| (f) KCNS, tannic acid+1,2 cyclohexanedione dioxime. | Co | Green. |
| | Fe | Black. |
| | Cu, Cr | Brown. |
| | Ni | Red. |
| (g) Violuric acid+tannic acid | Fe | Brown. |
| | Cu, Cr, Ni, Co | Yellow. |
| | VO | Grey. |
| (h) Violuric acid, tannic acid+NaAc. | Fe | Black. |
| | VO | Grey. |
| | Cu | Grey. |
| | Co | Yellow. |
| (i) Acetanilide+dimethylglyoxime. | Ni | Red. |
| | Cu, Co, Fe | Brown. |
| | VO | Grey. |
| | Cr | Pink. |
| (j) "Ferron"+2,4 dinitroresorcinol. | VO | Grey. |
| | Co | Orange. |
| (k) KCNS, acetanilide+Na salicylate. | Co | Blue. |
| | Fe, Cu | Black. |
| | Cr | Grey. |
| (l) Quinaldic acid+dimethylglyoxime. | Cu | Greenish Brown. |
| | Ni | Red. |
| | Cr, VO | Light Grey. |
| | Co, Fe | Light Brown. |
| (m) Gallocyanine+1,2 cyclohexanedione dioxime. | Fe | Brown. |
| | Cr | Pink. |
| (n) Tannic acid, thiourea+1,2 cyclohexanedione dioxime. | Ni | Red. |
| | Cu, Co | Yellow. |
| | Fe | Black. |
| | VO | Grey. |
| | Cr | Pink. |
| (o) Tannic acid, thiourea+dimethylglyoxime. | Ni | Red. |
| | Co, Cu | Yellow. |
| | Fe | Black. |
| | VO, Cr | Grey. |
| (p) Sym-diphenylcarbazide+8 HO-quinoline. | Ni, Co, Cu | Yellow-Brown. |
| | Fe | Black. |
| | Cr, VO | Brown. |
| (q) Sym-diphenylcarbazide+tannic acid. | Co, Cu, Ni | Red. |
| | Fe, VO | Black. |
| | Cr | Grey. |
| (r) Sym-diphenylcarbazide+salicylic acid. | Fe | Black. |
| | Ni, VO, Cu, Co, Cr | Red and Pink. |
| (s) Sym-diphenylcarbazide+sodium salicylate. | Fe | Black. |
| | Cu, Ni, VO | Red. |
| (t) Sodium salicylate, thiourea+1,2 cyclohexanedione dioxime. | Ni, Cr | Red. |
| | Co | Freen. |
| | Fe | Brown. |

To further demonstrate the present invention, various chart papers were treated so that the right and left side of the paper was provided with a coating of a different organic compound. As in the previous test, the reservoir of the marking assembly was filled with an aqueous solution of a transition metal salt. The charts were fitted into a recording instrument and the instrument was employed to record the magnitude of a condition over a period of time. The results obtained are set forth below in Table IV.

TABLE IV

| | Side | Coating | Metal Ions | Mark |
|---|---|---|---|---|
| (a) | 1 | Quinaldic acid | Fe | Yellow. |
| | 2 | Salicylic acid | Fe | Brown. |
| (b) | 1 | Nitroso-R salt (sodium salt of 1-nitroso-2-napthol-3,6 disulfonic acid). | Co | Red. |
| | 2 | KCNS | Co | Green. |
| (c) | 1 | Nitroso-R salt | Co | Red. |
| | 2 | Thiourea | Co | Green. |
| (d) | 1 | Sym-diphenylcarbazide | Ni-Fe | Brown. |
| | 2 | Salicylic acid | Ni-Fe | Brown. |
| (e) | 1 | Nitroso-R salt | Fe-Co | Brown. |
| | 2 | Salicylic acid | Fe-Co | Purple. |
| (f) | 1 | Dimethylglyoxime | Ni-Fe | Red. |
| | | | Ni-Co | Red. |
| | 2 | Thiourea | Ni-Fe | Light Yellow. |
| | | | Ni-Co | Green. |
| (g) | 1 | Dimethylglyoxime | Ni-Fe | Red. |
| | 2 | Na Salicylate | Ni-Fe | Brown. |
| (h) | 1 | 1,2 cyclohexanedione dioxime | Ni-Fe | Red. |
| | 2 | Na salicylate | Ni-Fe | Brown. |
| (i) | 1 | 1,2 cyclohexanedione dioxime | Ni-Co | Red. |
| | 2 | Thiourea | Ni-Co | Green. |
| (j) | 1 | 1,2 cyclohexanedione dioxime | Ni-Co | Red. |
| | | | Ni-Cu | Reddish Brown. |
| | 2 | KCNS | Ni-Co | Green. |
| | | | Ni-Cu | Dark Grey. |
| (k) | 1 | 1,2 cyclohexanedione dioxime | Ni-Fe | Brown. |
| | 2 | Salicylic acid | Ni-Fe | Dark Brown. |
| (l) | 1 | 1,2 cyclohexanedione dioxime | Ni-Fe | Reddish Brown. |
| | 2 | Tannic Acid | Ni-Fe | Black. |
| (m) | 1 | 1,2 cyclohexanedione dioxime | Ni-Fe | Reddish Brown. |
| | 2 | 8 H O-quinoline | Ni-Fe | Black. |

It is to be understood that this invention is not limited to the specific embodiments shown and that changes and modifications may be made within the scope of the appended claims.

What is claimed is:

1. In a recorder, the combination with a chart on which there are to be recorded magnitudes of a condition, of a pen adapted to engage said chart to record said magnitudes of a condition, said pen consisting of a capillary tube, and means for providing relative motion between said pen and said chart, said chart coated at least in limited areas thereof with a first component of a two component marking system for the chemical production of a visible marking on said chart upon the application thereto of the second component of said marking system, said first and second components being independently selected from the class consisting of (a) a salt of a transition metal and (b) an organic compound capable of reacting with said salt to provide said visible marking on said chart, with the provision that when the first component is selected from (a) the second component must be selected from (b) and vice versa.

2. The recorder of claim 1 in which the transition metal is selected from Table I above and the organic compound is selected from Table II above.

3. In a recorder, the combination with a chart on which there are to be recorded magnitudes of a condition, of a pen adapted to engage said chart to record said magnitudes of a condition, said pen consisting of a capillary tube, and means for minimizing the possibility of clogging of the capillary tube during operation of the recorder comprising a reservoir for a first component of a two component marking system, means including the chart for supplying in the region beneath said pen the second component of said marking system, means for driving said pen relative to said chart for the chemical production of a visible marking on said chart of said magnitudes of said condition, said first and second components of said marking system being independently selected from the class consisting of (a) a salt of a transition metal, and (b) an organic compound capable of reacting with said salt to provide said visible marking on said chart, with the provision that when the first component is selected from (a) the second component must be selected from (b) and vice versa.

4. The recorder of claim 3 in which the transition metal is selected from Table I above and the organic compound is selected from Table II above.

5. The recorder of claim 3 in which the transition metal is iron.

6. The recorder of claim 3 in which the transition metal is nickel.

7. The recorder of claim 3 in which the transition metal is cobalt.

8. The recorder of claim 3 in which the transition metal is copper.

9. The recorder of claim 3 in which the transition metal is chromium.

10. The recorder of claim 3 in which the transition metal is vanadium.

References Cited

UNITED STATES PATENTS

| 178,165 | 5/1876 | Kutz | 346—140 |
| 926,869 | 7/1909 | Harris | 346—140 |
| 1,405,409 | 2/1922 | Hall | 346—140 |
| 2,631,918 | 3/1953 | Kozak | 346—135 |
| 3,054,109 | 9/1962 | Brown | 346—140 |
| 3,063,050 | 11/1962 | Millis | 346—1 |
| 3,101,283 | 8/1963 | Brown | 346—140 |
| 3,278,327 | 10/1966 | Davis | 117—36.2 |

FOREIGN PATENTS

| 1,243,524 | 9/1960 | France. |

RICHARD B. WILKINSON, *Primary Examiner.*

M. LORCH, *Assistant Examiner.*